(12) United States Patent
Ando et al.

(10) Patent No.: US 10,248,232 B2
(45) Date of Patent: Apr. 2, 2019

(54) PRESS SENSOR AND ELECTRONIC DEVICE

(71) Applicant: Murata Manufacturing Co., Ltd., Nagaokakyo-shi, Kyoto-fu (JP)

(72) Inventors: Masamichi Ando, Nagaokakyo (JP); Kenichi Mori, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/414,932

(22) Filed: Jan. 25, 2017

(65) Prior Publication Data

US 2017/0131806 A1 May 11, 2017

Related U.S. Application Data

(63) Continuation of application No. PCT/JP2015/073177, filed on Aug. 19, 2015.

(30) Foreign Application Priority Data

Aug. 20, 2014 (JP) .................................. 2014-167534

(51) Int. Cl.
*G06F 3/041* (2006.01)

(52) U.S. Cl.
CPC .... *G06F 3/041* (2013.01); *G06F 2203/04105* (2013.01)

(58) Field of Classification Search
CPC ....................................................... G06F 3/041
See application file for complete search history.

(56) References Cited

U.S. PATENT DOCUMENTS

| 6,346,935 B1* | 2/2002 | Nakajima | G06F 1/1616 345/173 |
|---|---|---|---|
| 2010/0315337 A1* | 12/2010 | Ferren | G06F 1/169 345/158 |
| 2014/0152618 A1* | 6/2014 | Ando | G06F 3/044 345/174 |
| 2014/0347304 A1* | 11/2014 | Ando | G06F 3/041 345/173 |
| 2015/0193055 A1 | 7/2015 | Ando | |

FOREIGN PATENT DOCUMENTS

| WO | WO 2013021835 A1 | 2/2013 |
|---|---|---|
| WO | WO 2014045847 A1 | 3/2014 |

OTHER PUBLICATIONS

International Search Report issued for PCT/JP2015/073177, dated Nov. 2, 2015.
Written Opinion of the International Searching Authority issued for PCT/JP2015/073177, dated Nov. 2, 2015.

* cited by examiner

*Primary Examiner* — Alexander Eisen
*Assistant Examiner* — Cory A Almeida
(74) *Attorney, Agent, or Firm* — Arent Fox LLP

(57) ABSTRACT

A touch panel that includes a housing defining an opening and a piezoelectric film covering the opening. The opening has a shape whose lengths in an X direction and a Y direction are different. The piezoelectric film is stretched in a uniaxial direction, and is aligned such that the uniaxial direction forms an angle of 45 degrees with respect to the X direction and the Y direction.

21 Claims, 10 Drawing Sheets

Y DIRECTION
Z DIRECTION
X DIRECTION

Y DIRECTION
Z DIRECTION
X DIRECTION

FIG. 8
FIG. 8(A)
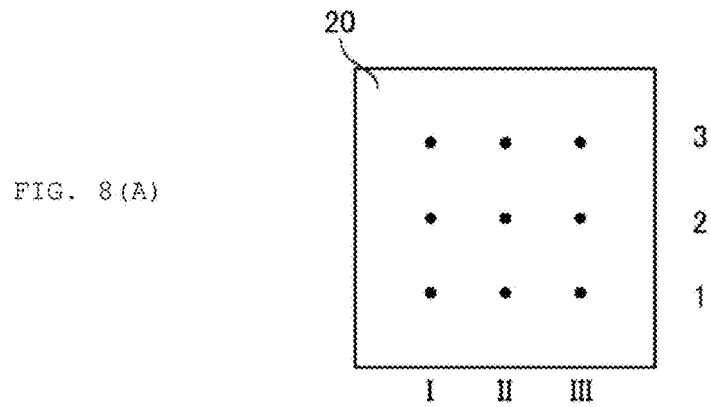
FIG. 8(B)
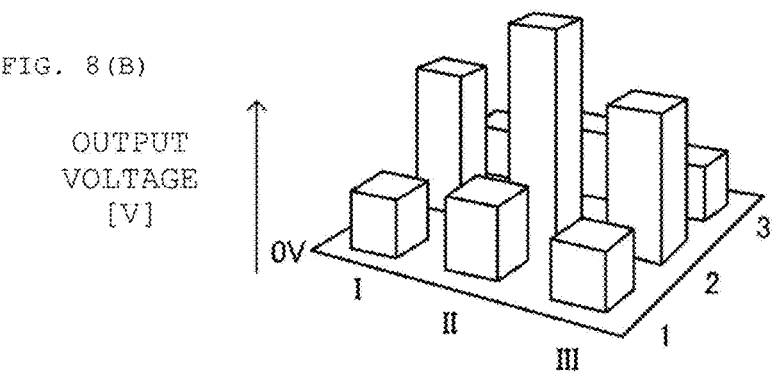
FIG. 8(C)
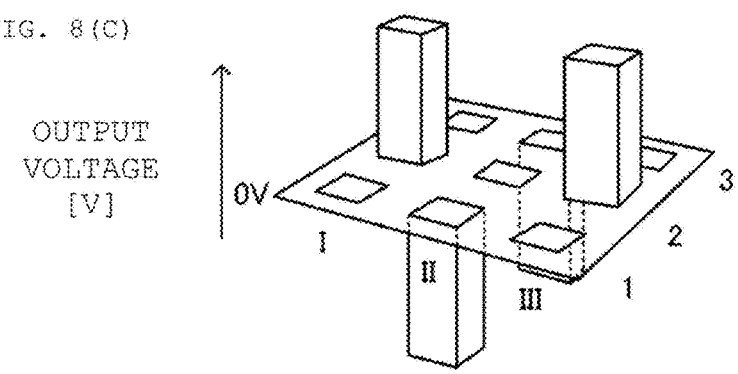

PRESS SENSOR AND ELECTRONIC DEVICE

CROSS REFERENCE TO RELATED APPLICATIONS

The present application is a continuation of International application No. PCT/JP2015/073177, filed Aug. 19, 2015, which claims priority to Japanese Patent Application No. 2014-167534, filed Aug. 20, 2014, the entire contents of each of which are incorporated herein by reference.

FIELD OF THE INVENTION

The present invention relates to a press sensor which includes a piezoelectric film, and an electronic device.

BACKGROUND OF THE INVENTION

Patent Document 1 discloses a touch panel which detects a touch position and a push amount by using a piezoelectric film. Polylactic acid (PLLA) stretched in a uniaxial direction is used for the piezoelectric film of the touch panel disclosed in Patent Document 1. When this PLLA is pressed, the PLLA is distorted in a normal direction of a plane. This distortion applies a force of contracting or stretching the PLLA in a direction of 45 degrees with respect to a stretching direction, and produces negative and positive charges. Further, by detecting a signal based on a potential difference between produced charge amounts, a pressing force with respect to the PLLA is detected.

Patent Document 1: International Publication No. 2013/021835 Pamphlet.

SUMMARY OF THE INVENTION

When PLLA whose lengths in a longitudinal direction and a lateral direction are different is pasted on a plate of a shape meeting the PLLA, and is pressed in a state where four sides of this plate are fixed, the PLLA is distorted differently in the longitudinal direction and the lateral direction. In this case, produced positive and negative charge amounts are different, so that charges hardly cancel each other and it is possible to detect a pressing force. However, when the PLLA has a square shape or a circular shape, and the pasted plate also has a shape meeting the PLLA, the PLLA is uniformly distorted in each direction depending on a pressing position, and produced positive and negative charge amounts sometimes become equal. In this case, produced positive and negative charges cancel each other. As a result, there is a problem that it is not possible to detect a signal from the PLLA, and detect a pressing force with respect to the PLLA.

An object of the present invention is to provide a press sensor and an electronic device which can prevent produced charges from being cancelled irrespectively of a pressing position, and detect a press.

A press sensor according to one embodiment of the present invention includes a frame body which defines a polygonal shaped opening; a plate covering the opening; and a piezoelectric film which includes electrodes formed on both principal surfaces is adhered to the plate. The piezoelectric film is stretched in a uniaxial direction, and a first distance of a first virtual line passing a center point of the polygonal shape and extending at an angle of 45 degrees with respect to the uniaxial direction, and a second distance of a second virtual line passing the center point and extending at an angle of −45 degrees with respect to the uniaxial direction are different.

According to this configuration, irrespectively of a shape (a square shape or a regular polygonal shape) of an area of a piezoelectric film to be deformed, an operation area which accepts a pressing operation has a non-square shape or a non-regular polygonal shape. In this case, when the operation area is pressed, the piezoelectric film is distorted differently in each direction irrespectively of a pressing position. Hence, positive and negative charge amounts produced in the piezoelectric film by a press are also different, and positive and negative charges do not cancel each other. As a result, it is possible to detect a signal from the piezoelectric film based on the produced charges. Consequently, it is possible to detect a press on the plate irrespectively of a pressing position. In this regard, the plate may be made of a glass substrate, PET or PC when the plate needs to be made transparent, and may be made of a glass epoxy substrate or a thin metal plate when the plate does not need to be made transparent. In case of a metal plate, it is necessary to insulate the metal plate and electrodes formed on the piezoelectric film. Further, the plate may be a touch panel or a liquid crystal panel.

A press sensor according to a further embodiment of the present invention includes a frame body which defines an elliptical opening; a plate covering the opening; and a piezoelectric film which includes electrodes formed on both principal surfaces is adhered to the plate such that a stretch axis of the piezoelectric film is a direction which forms an angle of 45 degrees with respect to a long axis of the elliptical shape.

According to this configuration, an operation area which accepts a pressing operation has an elliptical shape irrespectively of an area of the piezoelectric film to be deformed. In this case, when the operation area is pressed, the piezoelectric film is distorted differently in each direction irrespectively of a pressing position. Hence, positive and negative charge amounts produced in the piezoelectric film by a press are also different, and positive and negative charges do not cancel each other. As a result, it is possible to detect a signal from the piezoelectric film based on the produced charges. Consequently, it is possible to detect a press on the touch panel irrespectively of a pressing position.

The piezoelectric film is preferably made of a chiral polymer.

For example, the chiral polymer is polylactic acid or poly-L-lactic-acid. Further, when PVDF (polyvinylidene fluoride) is used for the piezoelectric film, there is a concern that a body temperature of a user's finger transmits to the piezoelectric film and influences detection performed by the piezoelectric film. However, by using polylactic acid having no pyroelectricity, the piezoelectric film can precisely detect a press.

According to the present invention, it is possible to detect a signal from a piezoelectric film without causing positive and negative charges produced in the piezoelectric film by a press to cancel each other irrespectively of a pressing position.

BRIEF EXPLANATION OF THE DRAWINGS

FIG. 8(A) is a view illustrating a pressing position of the operation area, FIG. 8(B) is a view illustrating an output voltage from the piezoelectric film when the operation area has a non-square shape, and FIG. 8(C) is a view illustrating an output voltage from the piezoelectric film when the operation area has a square shape.

DETAILED DESCRIPTION OF PREFERRED EMBODIMENTS OF THE INVENTION

An "electronic device" including a "press sensor" according to the present invention will be described by using a touch panel as an example.

Figure 1:
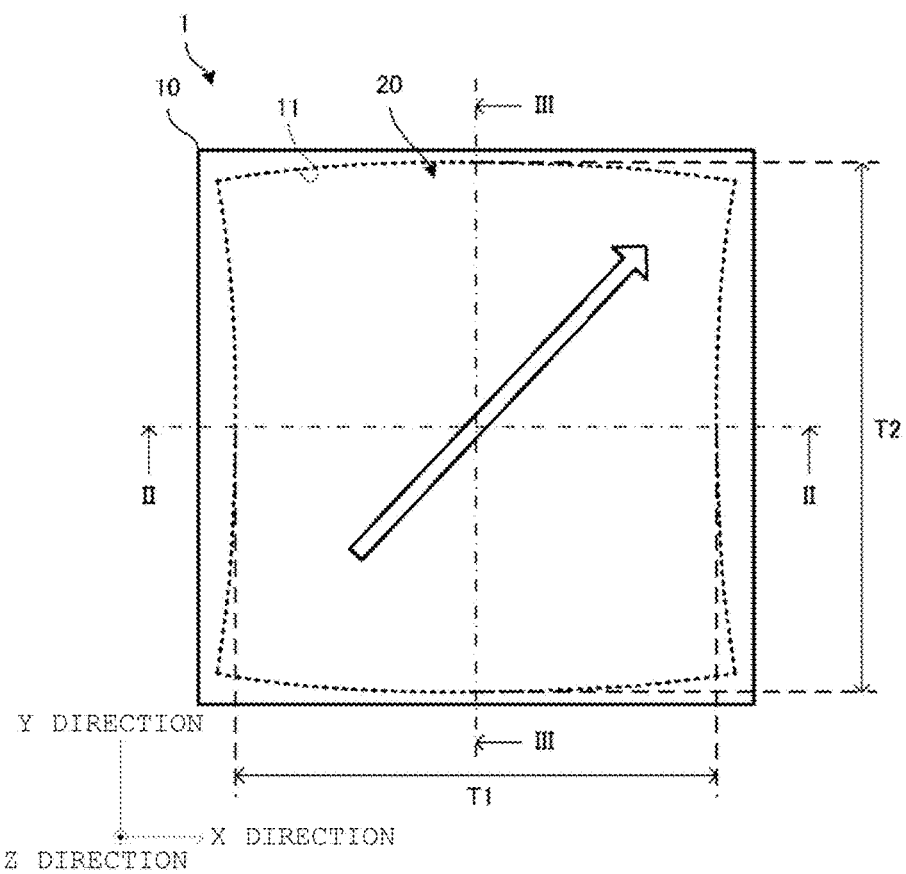
FIG. 1 is an external appearance plan view and a front view of a touch panel according to an embodiment.
Figure 1:
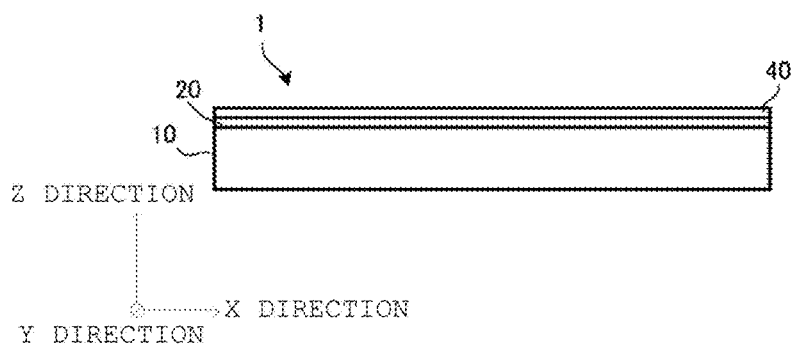

FIG. 1 is an external appearance plan view and a front view of the touch panel according to the present embodiment.

Figure 2:
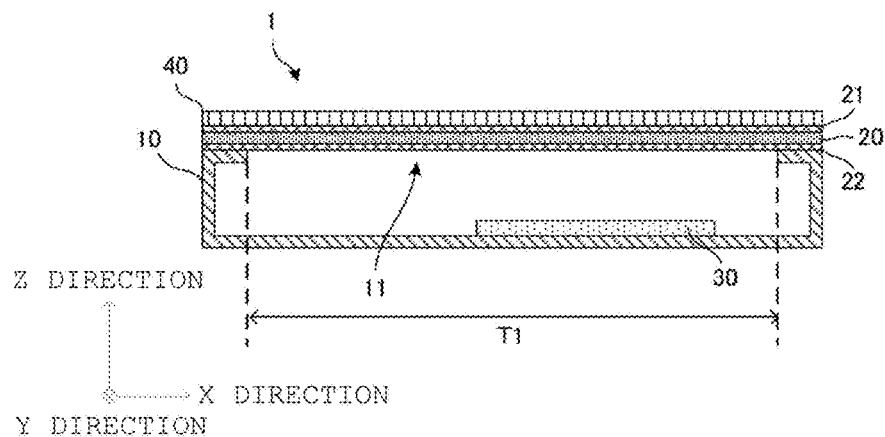
FIG. 2 is a sectional view taken along a line II-II in FIG. 1.
Figure 3:
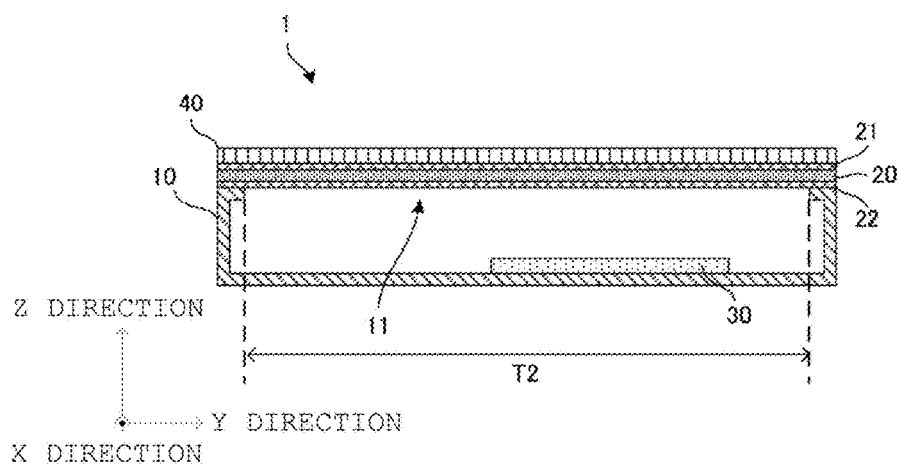
FIG. 3 is a sectional view taken along a line III-III in FIG. 1.

FIG. 2 is a sectional view taken along a line II-II in FIG. 1. FIG. 3 is a sectional view taken along a line III-III in FIG. 1.

A touch panel 1 includes a housing 10 of a nearly cuboid shape. A width direction (lateral direction) of the housing 10 will be referred to as an X direction, a length direction (longitudinal direction) will be referred to as a Y direction and a thickness direction will be referred to as a Z direction. The present embodiment will be described assuming that the length of the housing 10 in the X direction and the length of the housing 10 in the Y direction are the same, i.e., the housing 10 has a square shape in a plan view. A surface of the square shape of the housing 10 will be referred to as an operation surface below. The housing 10 corresponds to a "frame body" according to the present invention. The X direction corresponds to a "first direction" according to the present invention, and the Y direction corresponds to a "second direction" according to the present invention.

An opening 11 is formed in the operation surface of the housing 10. In the present embodiment, the opening 11 has a square shape which has two sides with outward extending arc shapes outward and lying along the X direction and two sides with inward recessed arc shapes lying along the Y direction. A shortest length T1 of this opening 11 in the X direction is shorter than a shortest length T2 in the Y direction.

More specifically, the length of a virtual line which passes a center point of the opening 11 and extends in the X direction is T1. Further, the length of a virtual line which passes the center point of the opening 11 and extends in the Y direction is T2. Furthermore, a relationship of T1<T2 holds.

The housing 10 is provided with a piezoelectric film 20 of a flat film shape to cover the opening 11. In this regard, the drawings illustrate a configuration where the piezoelectric film 20 is pasted to the housing 10. More specifically, a plate is pasted on the housing 10, and the piezoelectric film 20 is adhered to this plate. The plate may be made of a glass substrate, PET or PC when the plate needs to be made transparent, and may be made of a glass epoxy substrate or a thin metal plate when the plate does not need to be made transparent. In case of a metal plate, it is necessary to insulate the metal plate and electrodes formed on the piezoelectric film 20. Electrodes 21 and 22 are formed on both principal surfaces of the piezoelectric film 20 to cover the nearly entire principal surfaces. Further, the electrode 22 of the piezoelectric film 20 is provided at a side of the housing 10. The piezoelectric film 20 has a square shape similar to the surface of the housing 10 in a plan view, and is pasted to a frame portion of the operation surface surrounding the opening 11 by a double-sided tape or an adhesive. This double-sided tape or the like may be transparent or non-transparent.

In this regard, FIG. 1 does not illustrate the electrodes 21 and 22. Further, in the present embodiment, the piezoelectric film 20 and the electrodes 21 and 22 are non-light transmissive members, and a plan view of FIG. 1 illustrates the opening 11 as a broken line as a perspective view.

The area of the piezoelectric film 20 which overlaps the opening 11 is an operation area, and accepts a pressing operation performed by a user's finger, for example. This piezoelectric film 20 is provided with a protection cover 40 made of resin to cover the piezoelectric film 20. The user presses the operation area over this protection across 40, and the piezoelectric film 20 accepts a user's operation via the protection cover 40.

The piezoelectric film 20 is a film made of a chiral polymer. As the chiral polymer, polylactic acid (PLA) and, more particularly, poly-L-lactic-acid (PLLA) is used in the present embodiment. The PLLA made of a chiral polymer has a main chain which adopts a spiral structure. The PLLA has piezoelectricity when the PLLA is uniaxially stretched and molecules are oriented. Further, the uniaxially stretched PLLA produces charges when the flat surface of the piezoelectric film 20 is pressed. In this regard, the charge amount to be produced depends on the displacement amount at which the flat surface is displaced in a direction orthogonal to the flat surface according to a press amount.

In the present embodiment, a uniaxial stretching direction of the piezoelectric film 20 (PLLA) provided to the housing 10 is a direction which forms 45 degrees with respect to the X direction and the Y direction as indicated by an arrow in FIG. 1. The 45 degrees include, for example, an angle of approximately 45 degrees±10 degrees.

Further, the PLLA produces piezoelectricity by molecule orientation processing such as stretching, and does not need to be subjected to poling processing unlike other polymers such as PVDF or piezoelectric ceramics. That is, the piezoelectricity of the PLLA which does not belong to ferroelectrics is exhibited not by ion polarization as in ferroelectrics such as PVDF or PZT, but derives from a spiral structure which is a characteristic structure of molecules. Further, the PLLA does not exhibit pyroelectricity unlike other ferroelectric piezoelectric bodies. Furthermore, although PVDF or the like fluctuates in a piezoelectric constant over time and the piezoelectric constant significantly lowers in some cases, a piezoelectric constant of the PLLA is very stable over time. Consequently, it is possible to detect a displacement caused by a press with a high sensitivity without being influenced by the surrounding environment.

For the electrodes 21 and 22 formed on the both principal surfaces of the piezoelectric film 20, it is suitable to use ones of inorganic electrodes such as ITO, ZnO, silver nanowires, carbon nanotubes and graphene, and organic electrodes whose main components are polythiophene and polyaniline. By providing these electrodes 21 and 22, it is possible to obtain charges produced by the piezoelectric film 20 as a potential difference, and to output to an outside a press amount detection signal of a voltage value corresponding to a press amount. The press amount detection signal is output to an arithmetic circuit module 30 via a wiring which is not illustrated. The arithmetic circuit module 30 calculates a press amount based on a press amount detection signal.

When a touch panel is used and even when the touch panel is disposed at a side of a display surface by using electrodes having light-transmissiveness, visibility is influenced little, and the touch panel can be disposed near the operation surface, making it is possible to provide good press sensitivity. In case of use for which transparency is not necessary, a non-transparent conductive material such as aluminum or copper having a high conductivity may be used. When transparency is not necessary, for example, a press detecting device which does not include a display screen is disposed at a place such as a back surface of a display panel of the touch panel such that visibility is not influenced.

The arithmetic circuit module 30 is disposed inside the housing 10. More specifically, a mounting substrate (not illustrated) is disposed in the housing 10, and the arithmetic circuit module 30 is mounted on this mounting substrate.

Figure 4:
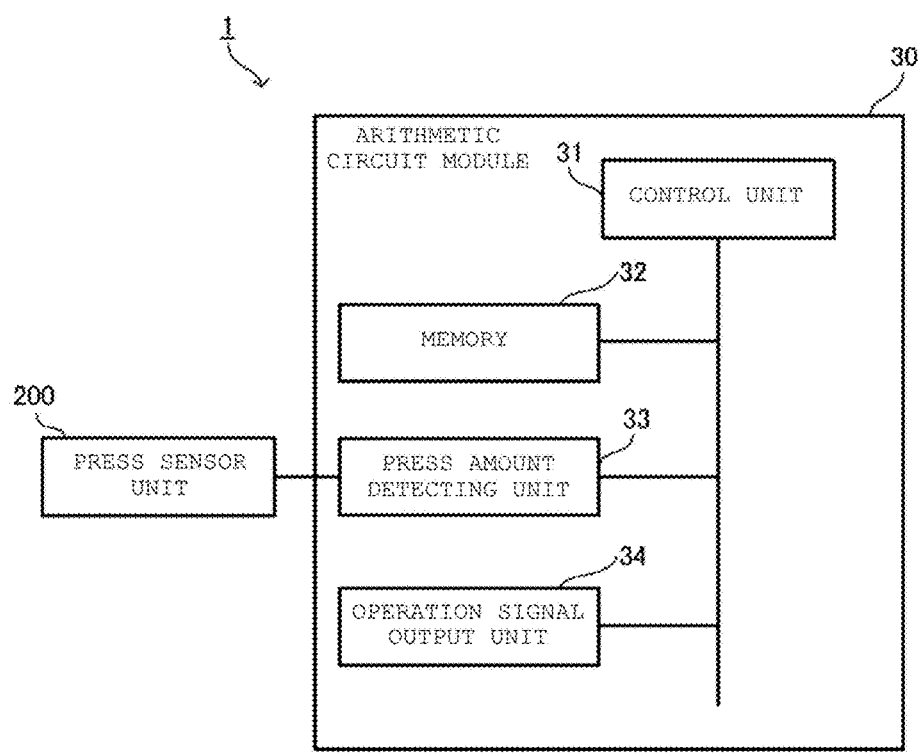
FIG. 4 is a block diagram illustrating a configuration of an arithmetic circuit module.

FIG. 4 is a block diagram illustrating a configuration of the arithmetic circuit module 30. The arithmetic circuit module 30 includes a control unit 31, a memory 32, a press amount detecting unit 33 and an operation signal output unit 34.

The control unit 31 is a CPU or the like, and controls an entire operation of the arithmetic circuit module 30 according to programs stored in the memory 32. The memory 32 is a RAM, a ROM and the like, stores a control program and successively stores arithmetic processing results and the like.

The press amount detecting unit 33 receives an input of a press amount detection signal from a press sensor unit 200. The press sensor unit 200 includes the piezoelectric film 20 and the electrodes 21 and 22. The press amount detection signal is output from the electrodes 21 and 22 based on a potential difference produced in the piezoelectric film 20 pressed and curved by the user's finger via the protection cover 40. In the memory 32, signal levels of press amount detection signals and press amounts are associated and stored. The press amount detecting unit 33 reads from the memory 32 the press amount associated with the signal level of the input press amount detection signal, and outputs the press amount to the control unit 31.

When a touch operation is performed, the operation signal output unit 34 outputs an operation signal allocated to a press amount of this touch operation to an outside.

Hereinafter, charges produced when the piezoelectric film 20 is pressed will be described.

A direction of the piezoelectric film 20 which forms 45 degrees with respect to the X direction and the Y direction is the uniaxial stretching direction. When stretched or contracted (distorted) in the X direction and the Y direction which are directions which form 45 degrees with respect to the uniaxial stretching direction, the piezoelectric film 20 produces positive and negative charges. Hence, when distortion amounts of the piezoelectric film 20 produced in the X direction and the Y direction are the same, produced positive and negative charge amounts are equal and charges cancel each other. As a result, it is not possible to detect a press amount detection signal from the piezoelectric film 20. A case where distortion amounts of the piezoelectric film 20 produced in the X direction and the Y direction are the same means, for example, a case where the opening 11 of the housing 10 covered by the piezoelectric film 20 has a square shape, an operation area has a square shape and a diagonal line of this square shape is pressed.

Figure 5A:
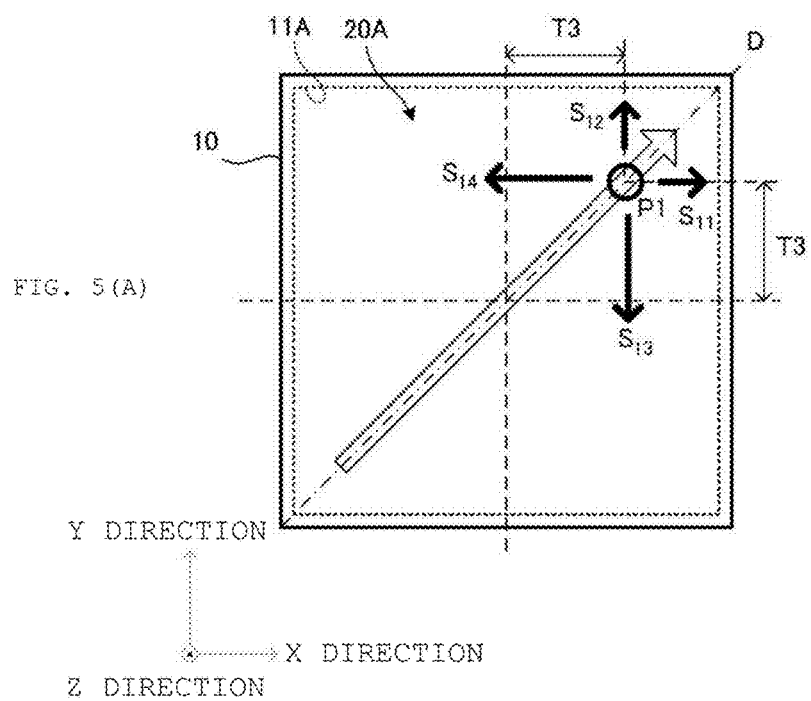
FIG. 5(A) is a view illustrating distortion components produced in a piezoelectric film when an operation area of a square shape is pressed.
Figure 5B:
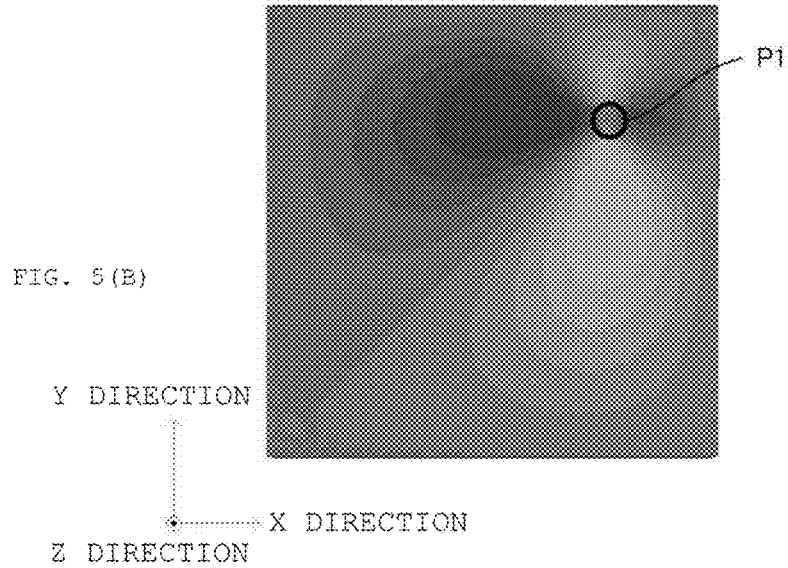
FIG. 5(B) is a distribution diagram of produced potentials of the piezoelectric film during a press.

FIG. 5(A) is a view illustrating distortion components produced in a piezoelectric film when the operation area of the square shape is pressed. FIG. 5(B) is a distribution diagram of produced potentials of the piezoelectric film during a press. In this regard, an outlined arrow in FIG. 5(A) is the uniaxial stretching direction of the piezoelectric film 20.

In FIG. 5(A), an opening 11A of a square shape having the same center as that of the operation surface is formed on the operation surface of the square shape of the housing 10. When a piezoelectric film 20A is provided to the housing 10 to cover this opening 11A, the operation area has a square shape. In this case, the piezoelectric film 20 and the operation area have the same center, and have the same diagonal line D. A case where a position on the diagonal line D of the square shape is pressed in the operation area of this square shape will be described. FIG. 5(A) illustrates that a position P1 which is located at a length T3 apart from the center point of the piezoelectric film 20A of the square shape in the X direction and the Y direction is pressed.

In this case, lengths from a pressing position P1 to sides of the opening 11A in positive directions of the X direction and the Y direction are equal. Further, lengths from the pressing position P1 to sides of the opening 11A in negative directions of the X direction and the Y direction are also equal. In this case, when the pressing position P1 is pressed, distortion amounts of the piezoelectric film 20A produced in the positive directions of the X direction and the Y direction from the pressing position P1 are equal, and the distortion amounts of the piezoelectric film 20A produced in the negative directions of the X direction and the Y direction from the pressing position P1 are also equal. That is, the diagonal line D of the operation area of the square shape is deformed (distorted) symmetrically with respect to the center. In this regard, magnitudes of distortion components of the piezoelectric film 20A produced in the X direction by a pressing operation are defined as $S_{11}$ and $S_{14}$, and magnitudes of components in the Y direction are defined as $S_{12}$ and $S_{13}$. In this case, $S_{11}=S_{12}$, and $S_{13}=S_{14}$ hold.

In FIG. 5(B), a light color area is an area in which more positive charges are produced, and a dark color area indicates an area in which more negative charges are produced. As illustrated in this FIG. 5(B), areas in which the positive and negative charges are produced by $S_{11}$ and $S_{12}$ are substantially equal, and areas in which the positive and negative charges are produced by $S_{13}$ and $S_{14}$ are also substantially equal. As a result, produced charges are entirely cancelled, and therefore it is not possible to extract a press amount detection signal from the piezoelectric film 20A. Thus, when the piezoelectric film 20A of the square shape is deformed (distorted) symmetrically with respect to the diagonal line D as the center, it is not possible to detect a press on the piezoelectric film 20A.

Hence, in the present embodiment, even when the piezoelectric film 20 has a square shape, it is possible to detect a press on the piezoelectric film 20 by preventing the piezoelectric film 20 from being symmetrically distorted as described above. Hence, the opening 11 covered by the piezoelectric film 20 has a shape each of which sides of a square shape is deformed in the X direction and the Y direction, and the operation area has a non-square shape.

Figure 6:
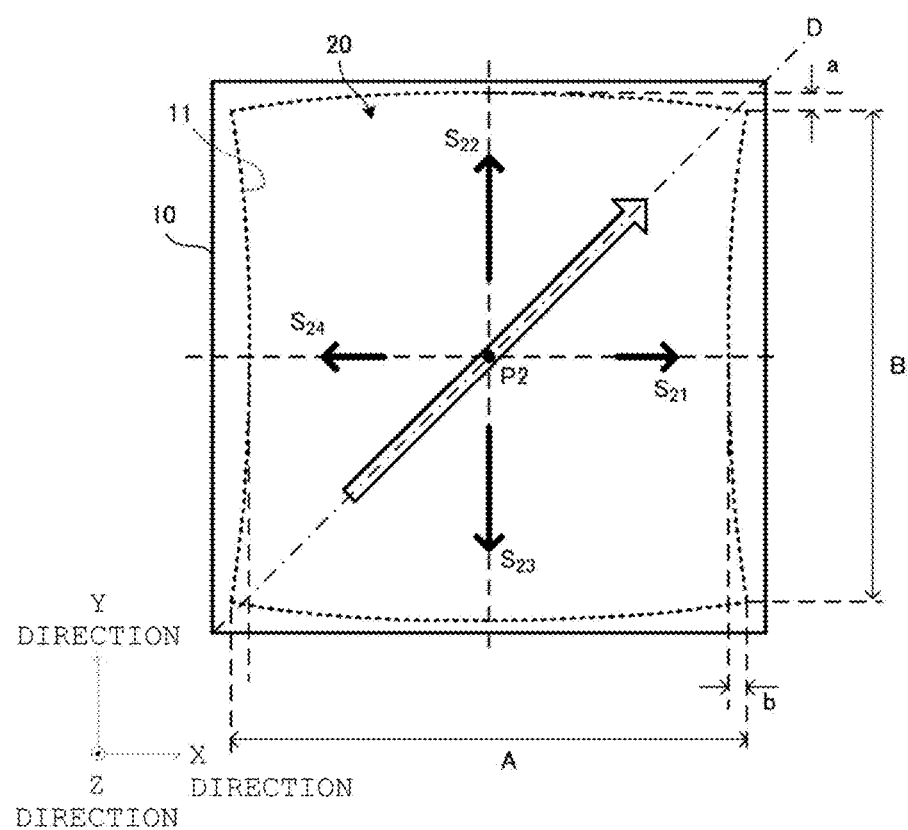
FIG. 6 is a view for explaining a shape of an opening, and distortion components produced in the piezoelectric film.

FIG. 6 is a view for explaining a shape of the opening 11, and distortion components produced in the piezoelectric film 20. An outlined arrow in FIG. 6 indicates the uniaxial stretching direction.

The opening 11 has a shape whose two sides lying along the X direction have shapes protruding outward and whose two sides lying along the Y direction have shapes recessed inward. A curve of each side may be an arc, an elliptical arc, part of a cycloid curve, part of a lemniscate curve or a simple spline curve. A deformation amount of each side of the opening 11 may be approximately 1% of the length of one side. More specifically, when the length of a line which linearly connects apexes of two corners of the opening 11 lying along the X direction is A, the length of a line which linearly connects apexes of two corners lying along the Y direction is B, a protrusion amount of the sides of the opening 11 lying along the X direction is a, and a protrusion amount of sides lying along the Y direction is b, deformation amounts a/A and b/B only have to be approximately 1%.

The opening 11 covered by the piezoelectric film 20 has the above shape, so that the operation area has the non-square shape. This opening 11 is formed on the operation surface of the housing 10 such that the center is matched with the center of the piezoelectric film 20. Hence, the diagonal line D of the piezoelectric film 20 passes the center of the operation area. When a position on this diagonal line D such as a position P2 at the center of the operation area is pressed, the lengths from the pressing position P2 to sides of the opening 11 in the X direction and the Y direction are different. More specifically, the length from the pressing position P2 to the side of the opening 11 in the X direction is shorter than the length from the pressing position P2 to the side of the opening 11 in the Y direction. Hence, even when the position P2 on the diagonal line D of the piezoelectric film 20 is pressed, the piezoelectric film 20 is not distorted symmetrically with respect to this diagonal line D. In this regard, distortion components of the piezoelectric film 20 produced in the X direction by a pressing operation are defined as $S_{21}$ and $S_{24}$, and components in the Y direction are defined as $S_{22}$ and $S_{23}$. In this case, $S_{21} \neq S_{22}$ holds and $S_{23} \neq S_{24}$ holds.

Figure 7A:
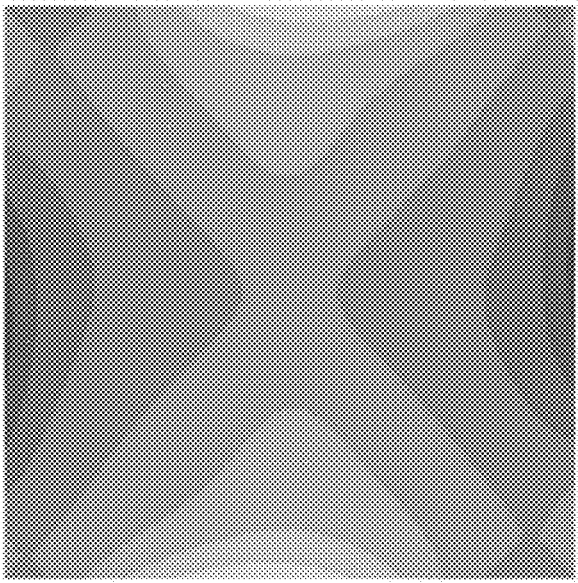
FIG. 7(A) is a distribution diagram of produced potentials while the piezoelectric film according to the embodiment is pressed.
Figure 7B:
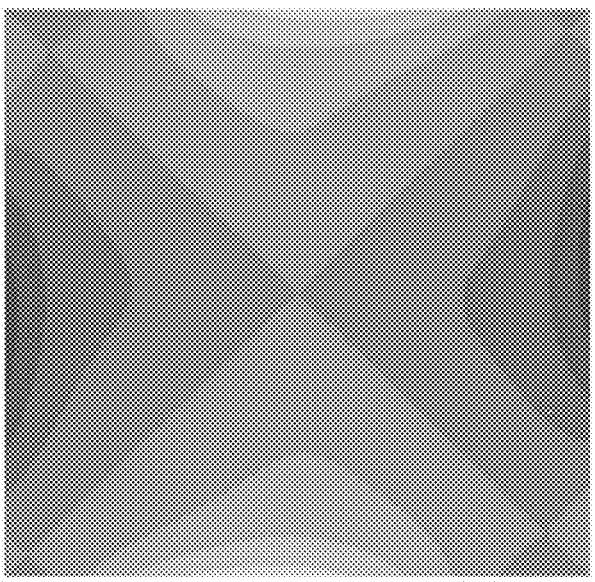
FIG. 7(B) is a distribution diagram of produced potentials of the piezoelectric film while an operation area has a square shape in comparison with the embodiment.

FIG. 7(A) is a distribution diagram of produced potentials during a press on the piezoelectric film 20 according to the present embodiment. FIG. 7(B) is a distribution diagram of produced potentials of the piezoelectric film 20A while an operation area has a square shape in comparison with the embodiment.

In both of FIGS. 7(A) and 7(B), pressing positions are at the centers of the piezoelectric films 20 and 20A of the square shapes.

When the operation area has the square shape, as illustrated in FIG. 7(B), a positive potential level and a negative potential level are equal and respective areas also have equal areas. Therefore, potentials of the entire piezoelectric film 20A are very small, and it is not possible to detect a press detection signal. By contrast with this, when the operation area has the non-square shape, as described with reference to FIG. 6, a balance between distortion components in the X direction and the Y direction is lost. Therefore, as illustrated in FIG. 7(A), the positive potential level is high, and the negative potential level is low. Hence, the potentials of the entire piezoelectric film 20 are high. Consequently, it is possible to detect a press detection signal.

FIG. 8(A) is a view illustrating a pressing position of the operation area, FIG. 8(B) is a view illustrating an output voltage from the piezoelectric film 20 when the operation area has a non-square shape, and FIG. 8(C) is a view illustrating an output voltage from the piezoelectric film 20A when the operation area has a square shape.

When the operation area has the square shape, as illustrated in FIG. 8(C), for example, at a pressing position I-1, an output voltage is 0 V, and, at a pressing position II-1, a minus voltage is output and an output polarity is inverted. By contrast with this, when the operation area has the non-square shape, at any pressing position, a plus voltage is output at all times, so that it is possible to obtain a sufficient output from all positions and the output polarity is not inverted, either.

Thus, even when the piezoelectric film 20 has the square shape, the operation area has the non-square shape, and distortion components of the piezoelectric film 20 produced in the X direction and the Y direction are made to differ, so that it is possible to reliably detect a user's pressing operation.

In this regard, the shape of the opening 11 for forming the operation area in the non-square shape is not limited to the above shape. More specifically, when the uniaxial stretching direction of the piezoelectric film 20 is the direction which forms 45 degrees with respect to the X direction and the Y direction, the lengths of the operation area in the X direction and the Y direction which are directions forming 45 degrees with respect to the uniaxial stretching direction only have to be unequal. One example will be described below.

Figure 9:
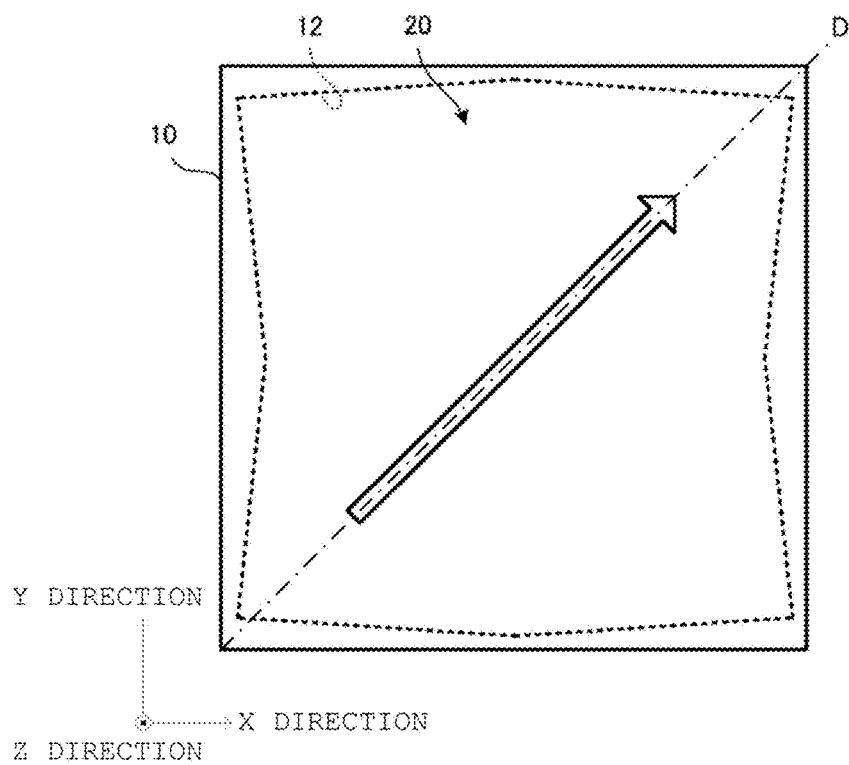
FIG. 9 is a view illustrating another example of a shape of an opening covered by a piezoelectric film.
Figure 10:
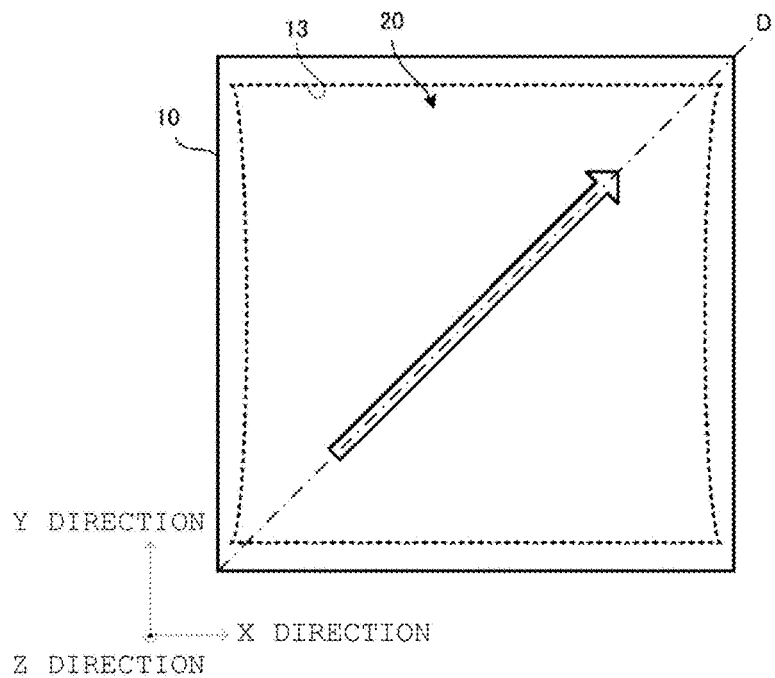
FIG. 10 is a view illustrating another example of a shape of an opening covered by a piezoelectric film.
Figure 11:
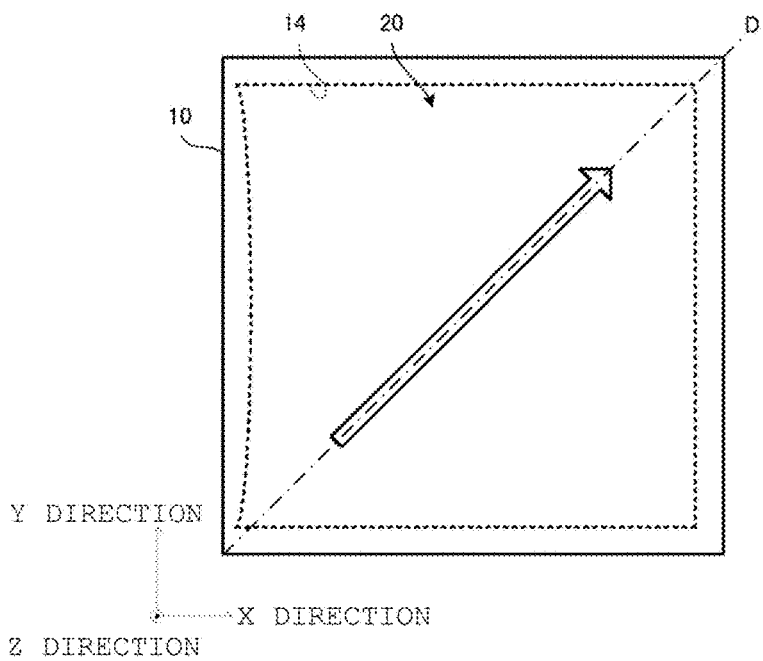
FIG. 11 is a view illustrating another example of a shape of an opening covered by a piezoelectric film.

FIGS. 9, 10, and 11 are views illustrating other examples of a shape of the opening covered by the piezoelectric film 20.

An opening 12 illustrated in FIG. 9 has a shape each side of which has a protruded shape or a recessed shape by using two lines. Further, an opening 13 illustrated in FIG. 10 has a shape only two sides of which have shapes recessed inward, the two side lying along the Y direction. An opening 14 illustrated in FIG. 11 has a shape only one side of which has a shape recessed inward, the one side lying along the Y direction.

Thus, the operation area has the non-square shape, so that, even when any position of the operation area is pressed, the piezoelectric film 20 is not uniformly distorted in the X direction and the Y direction. As a result, positive and negative charges produced by a press do not cancel each other, so that it is possible to detect a press detection signal from the piezoelectric film 20.

Further, the uniaxial stretching direction of the piezoelectric film 20 is the direction which forms 45 degrees with respect to the X direction and the Y direction. However, even when the uniaxial stretching direction is, for example, the Y direction, the lengths of the operation area in directions forming 45 degrees with respect to the uniaxial stretching direction only have to be unequal.

Figure 12:
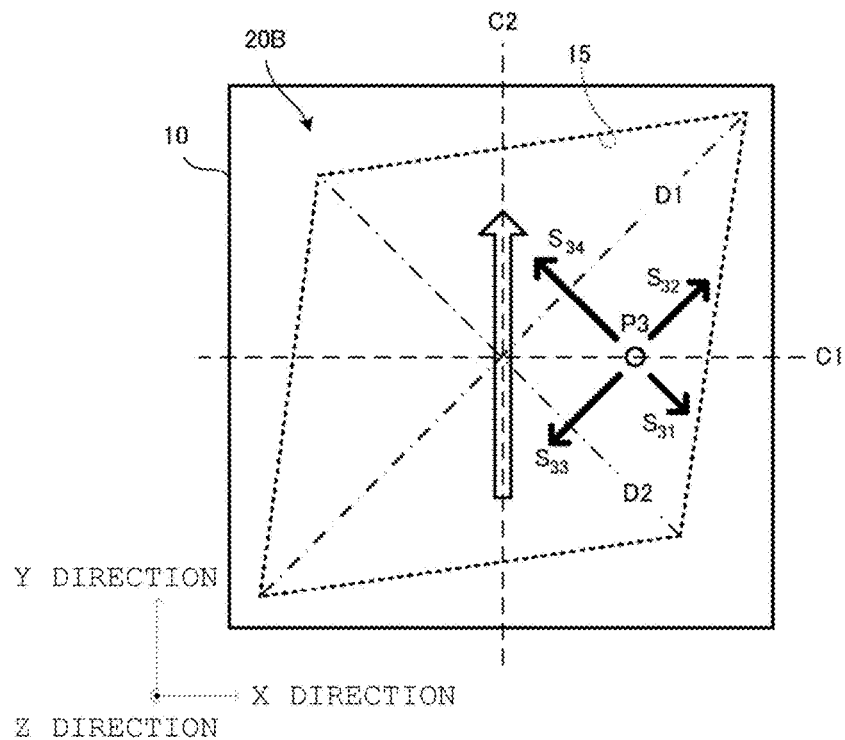
FIG. 12 is a view illustrating an example of a shape of an opening covered by a piezoelectric film when a Y direction is a uniaxial stretching direction.

FIG. 12 is a view illustrating an example of a shape of an opening covered by the piezoelectric film when the Y direction is the uniaxial stretching direction. An outlined arrow in FIG. 12 is the uniaxial stretching direction of a piezoelectric film 20B of a square shape.

An opening 15 illustrated in FIG. 12 has a quadrilateral shape having corner portions on a diagonal line of the piezoelectric film 20B of the square shape. Directions which form 45 degrees with respect to the uniaxial stretching direction, i.e., lengths of two diagonal lines D1 and D2 are different on the opening 15. In this case, even when any position on center lines C1 and C2 of each side of the piezoelectric film 20B in the X direction and the Y direction is pressed, positive and negative charges produced by a press do not cancel each other. When, for example, a position P3 on the center line C1 is pressed and the piezoelectric film 20B is distorted, and distortion components in a direction which forms 45 degrees with respect to the X direction and the Y direction are $S_{31}$, $S_{32}$, $S_{33}$ and $S_{34}$, $S_{31}$, $S_{32}$, $S_{33}$, and $S_{34}$ are different from each other. That is, the piezoelectric film 20B is not distorted symmetrically with respect to the center line C1 as the center. As a result, positive and negative charges produced by a press do not cancel each other, so that it is possible to detect a press detection signal from the piezoelectric film 20B.

In this regard, the piezoelectric film may not have the square shape, and may have a circular shape. Even in this case, the lengths of the operation area in directions which form 45 degrees with respect to the uniaxial stretching direction of the piezoelectric film only have to be unequal.

Figure 13:
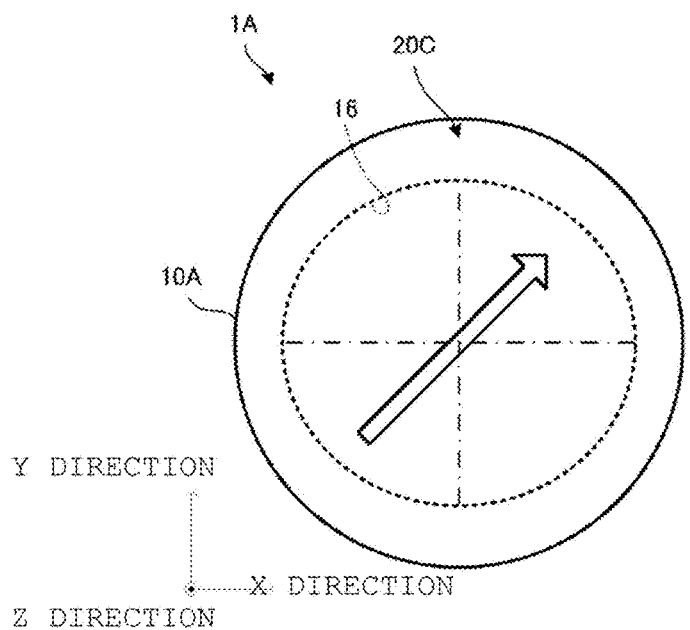
FIG. 13 is a view illustrating an example of a shape of an opening covered by a piezoelectric film of a circular shape.

FIG. 13 is a view illustrating an example of a shape of an opening covered by a piezoelectric film of a circular shape. An outlined arrow in FIG. 13 is the uniaxial stretching direction of a piezoelectric film 20C of a circular shape.

A touch panel 1A illustrated in FIG. 13 includes a housing 10A of a cylindrical shape, and an opening 16 is formed in a top panel of this housing 10A. This opening 16 has an elliptical shape. In FIG. 13, a long axis direction of the elliptical shape is the X direction and a short axis direction is the Y direction. In this case, the piezoelectric film 20C is provided to the housing 10A such that the uniaxial stretching direction is the direction which forms 45 degrees with respect to the X direction and the Y direction. The piezoelectric film 20C covers the opening 16 of this elliptical shape, so that an operation area has an elliptical shape.

When the operation area has the circular shape, and any position on a line (or a line orthogonal to this line) along a direction which passes a center of the circular shape and which forms 45 degrees with respect to the X direction and the Y direction is pressed, the piezoelectric film 20C is deformed symmetrically with respect to this line as the center similarly to a case where the operation area has the square shape. That is, produced charges are entirely cancelled. Hence, when the operation area has the elliptical shape, the piezoelectric film 20C is not distorted symmetrically. As a result, positive and negative charges produced by a press do not cancel each other, so that it is possible to detect a press detection signal from the piezoelectric film 20C.

In this regard, the above touch panels 1 and LA may be configured to each have a display panel which displays images and a position detecting sensor which detects a pressing position, and to be provided with a piezoelectric film on the display panel. In this case, preferably, the piezoelectric film has light-transmissiveness, and a double-sided tape or an adhesive which pastes the piezoelectric film on a display panel or a position detecting sensor and on a plate is an OCA (Optical Clear Adhesive).

Further, in the above embodiment, the "frame body" according to the present invention is the housings 10 and 10A in which the arithmetic circuit module 30 can be disposed. However, only a frame which includes an opening which forms an operation area and holds a piezoelectric film around the opening may be the "frame body" according to the present invention.

According to the present embodiment, the touch panel has been described as an example of the electronic device which includes the "press sensor". However, the present invention can be used for the touch panel and, in addition, touch pads for notebook computers, push buttons, and display units of wristwatches.

DESCRIPTION OF REFERENCE SYMBOLS 1, 1A: touch panel
10, 10A: housing
11, 11A, 12, 13, 14, 15, 16: opening
20, 20A, 20B, 20C: piezoelectric film
21, 22: electrode
30: arithmetic circuit module
31: control unit
32: memory
33: press amount detecting unit
34: operation signal output unit
40: protection cover
200: press sensor unit
C1, C2: center line
D, D1, D2: diagonal line
P1, P2, P3: pressing position

The invention claimed is:

1. A press sensor comprising:
a frame body having an inner periphery defining an elliptical opening;
a plate covering the elliptical opening; and
a uniaxially stretched piezoelectric film having electrodes on opposed principal surfaces thereof adhered to the plate and extending over the opening in such a manner that a virtual line extending along a uniaxial stretch direction of the piezoelectric film passes through a center of the opening such that a uniaxial stretch direction of the piezoelectric film forms an angle of 45±10 degrees with respect to a long axis of the elliptical opening.

2. The press sensor according to claim 1, wherein the piezoelectric film is made of a chiral polymer.

3. An electronic device comprising:
the press sensor according to claim 1; and
a detecting unit which detects a press amount based on a potential difference produced in the piezoelectric film and output as a press amount detection signal from the press sensor.

4. A press sensor comprising:
a frame body having an inner periphery defining an opening having a shape;
a plate covering the opening;
a uniaxial stretched piezoelectric film having electrodes on opposed principal surfaces thereof, the piezoelectric film being adhered to the plate and extending over the opening in such a manner that a first virtual line extending along the uniaxial stretch direction of the piezoelectric film passes through a center of the opening;
the shape of the opening being such that when the piezoelectric film is pressed along the virtual line, the piezoelectric film is not distorted symmetrically with respect to the virtual line.

5. An electronic device comprising:
the press sensor according to claim 4; and a detecting unit which detects a press amount based on a potential difference produced in the piezoelectric film and output as a press amount detection signal from the press sensor.

6. The electronic device according to claim 4, wherein:
a second virtual line extends at an angle of +45±10 with respect to the first virtual line and intersects the inner periphery of the frame body at first and second points on opposite sides of the center of the opening, the distance from the center of the opening to the first point and the distance from the center of the opening to the second point being x; and
a third virtual line extends at an angle of −45±10 with respect to the first virtual line and intersects the inner periphery of the frame body at third and fourth points on opposite sides of the center of the opening, the distance from the center of the opening to the third point and the distance from the center of the opening to the fourth point being y, x and y not being equal.

7. The press sensor according to claim 6, wherein the opening has:
first and second side sections opposing one another, the second virtual line intersecting the first and second side sections at the first and second points, respectively; and
third and fourth side sections opposing one another, the third virtual line intersecting the third and fourth side sections at the third and fourth points, respectively.

8. The press sensor according to claim 7, wherein the first and second side sections have a shape that bends towards the center point.

9. The press sensor according to claim 8, wherein the third and fourth side sections are straight line surfaces.

10. The press sensor according to claim 8, wherein the third and fourth side sections have a shape that bends away from the center point.

11. The press sensor according to claim 7, wherein the third and fourth side sections have a shape that bends away from the center point.

12. The press sensor according to claim 7, wherein the first and second side sections are curved surfaces that bend toward the center point.

13. The press sensor according to claim 12, wherein the third and fourth side sections are curved surfaces that bend away from the center point.

14. The press sensor according to claim 7, wherein the third and fourth side sections are curved surfaces that bend away from the center point.

15. The press sensor according to claim 7, wherein the first and second side sections are defined by respective pairs of straight line segments which form a v-shape which points towards the center point.

16. The press sensor according to claim 15, wherein the third and fourth side sections are defined by respective pairs of straight line segments which form a v-shape which points away from the center point.

17. The press sensor according to claim 7, wherein the third and fourth side sections are defined by respective pairs of straight line segments which form a v-shape which points away from the center point.

18. The press sensor according to claim 7, wherein the first side sections is a curved surface that bends toward the center point.

19. The press sensor according to claim 7, wherein:
the opening has a rhomboid shape including first, second, third and fourth corners;
a second virtual line extends at an angle of +45±10 with respect to the first virtual line and intersects the inner periphery of the frame body at the first and third corners, the distance from the center of the opening to the first corner and the distance from the center of the opening to the second corner being x; and
a third virtual line extends at an angle of −45±10 with respect to the first virtual line and intersects the inner periphery of the frame body at second and fourth corners, the distance from the center of the opening to the second corner and the distance from the center of the opening to the fourth corner being y, x and y not being equal.

20. The press sensor according to claim 6, wherein the piezoelectric film is made of a chiral polymer.

21. The press sensor according to claim 4, wherein the frame has an outer periphery which has a different shape than a shape of the opening.

* * * * *